Sept. 8, 1936.     R. STEENECK     2,053,749
TRANSMITTER FOR STOCK QUOTATION BOARDS
Original Filed Dec. 14, 1929     4 Sheets-Sheet 1
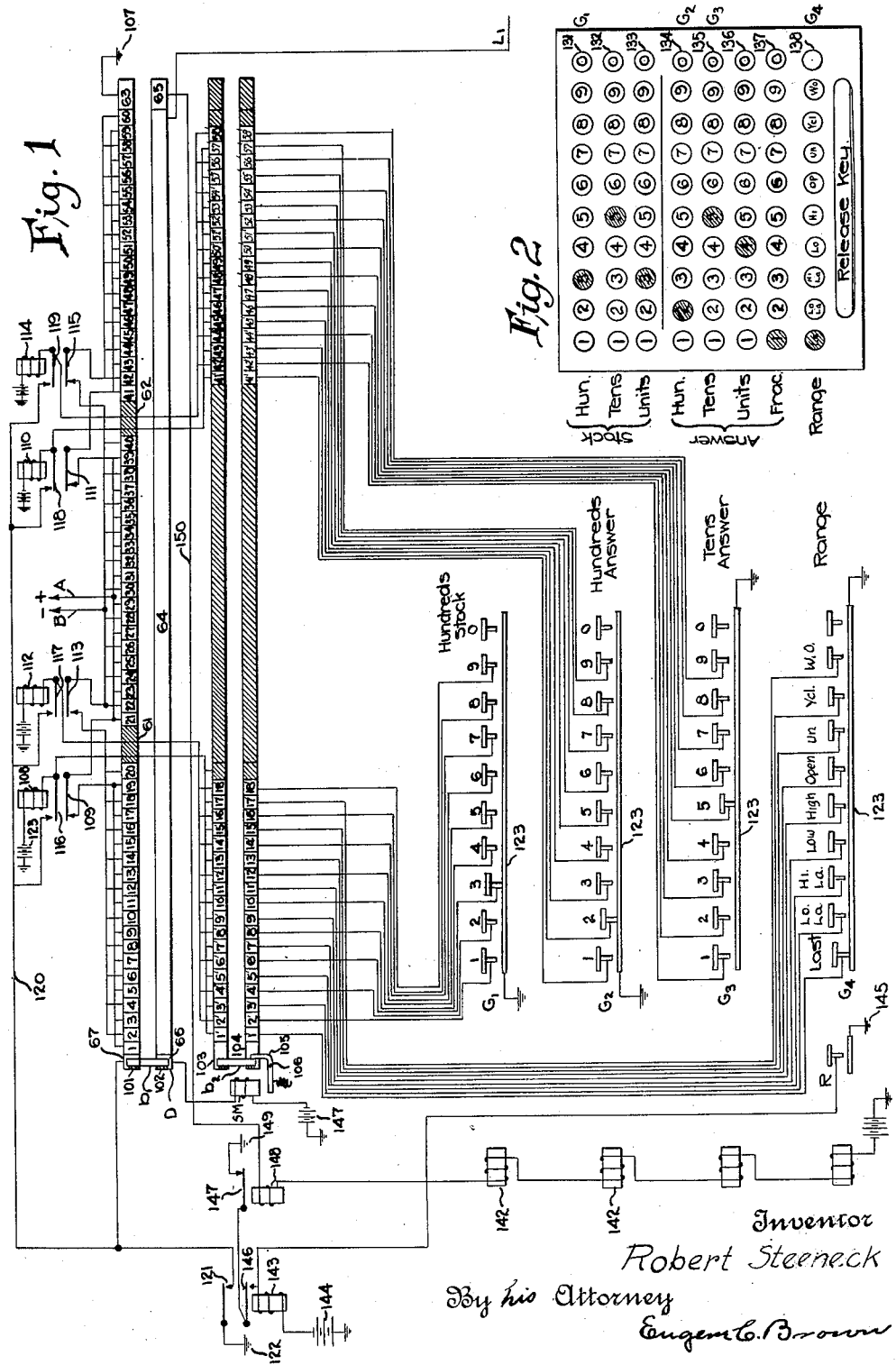
Inventor
Robert Steeneck
By his Attorney
Eugene C. Brown Sept. 8, 1936. R. STEENECK 2,053,749
TRANSMITTER FOR STOCK QUOTATION BOARDS
Original Filed Dec. 14, 1929 4 Sheets-Sheet 2
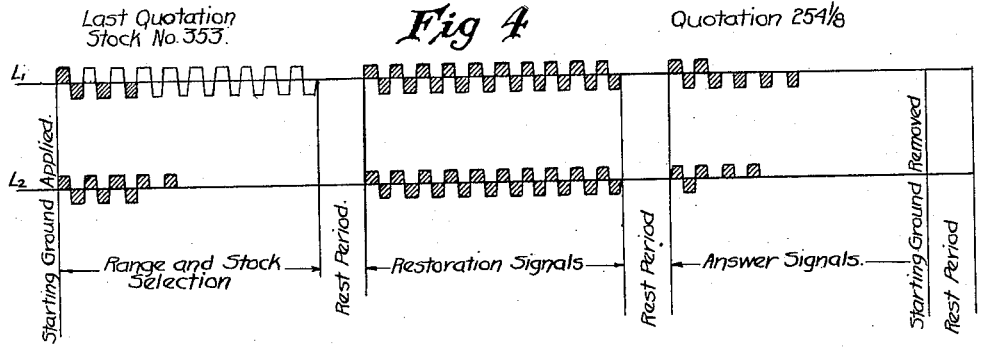
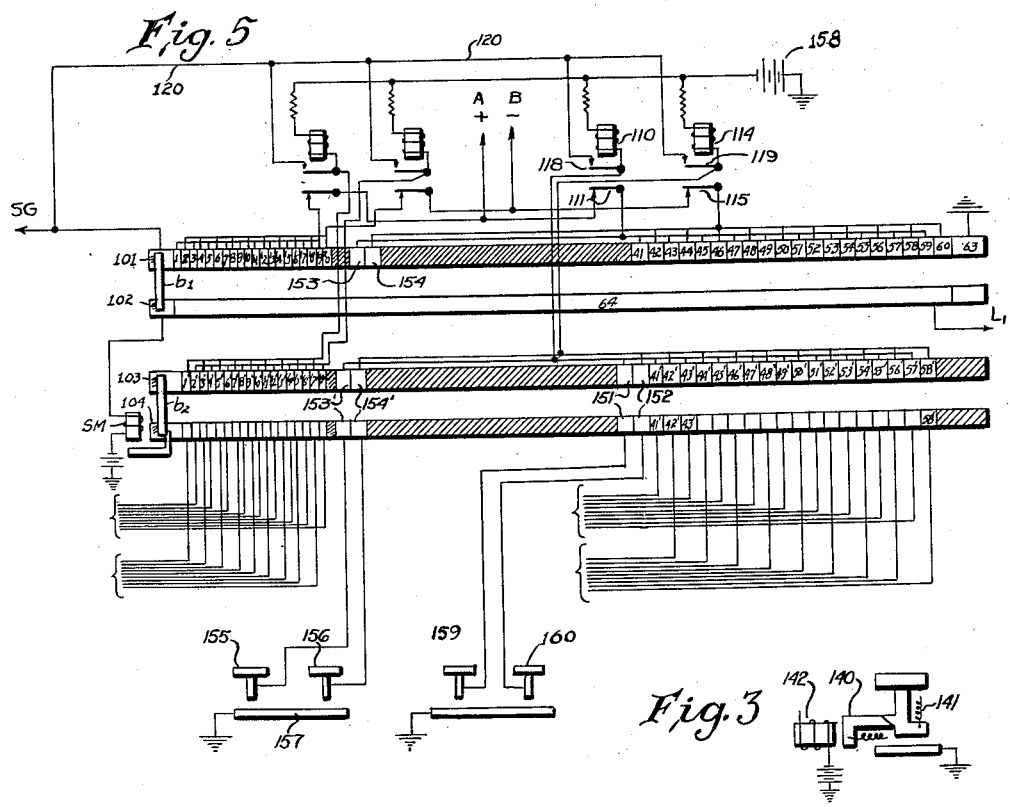
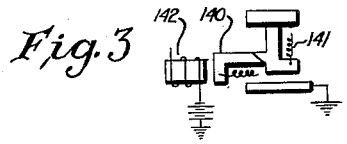
Inventor
Robert Steeneck
By his Attorney
Eugene C. Brown Sept. 8, 1936.          R. STEENECK          2,053,749
TRANSMITTER FOR STOCK QUOTATION BOARDS
Original Filed Dec. 14, 1929    4 Sheets-Sheet 3

INVENTOR
ROBERT STEENECK
BY
Eugene C. Brown
ATTORNEY

Sept. 8, 1936. R. STEENECK 2,053,749
TRANSMITTER FOR STOCK QUOTATION BOARDS
Original Filed Dec. 14, 1929  4 Sheets-Sheet 4

INVENTOR
ROBERT STEENECK
BY
ATTORNEY

Patented Sept. 8, 1936

2,053,749

UNITED STATES PATENT OFFICE 2,053,749

TRANSMITTER FOR STOCK QUOTATION BOARDS

Robert Steeneck, New York, N. Y., assignor to The Western Union Telegraph Company, New York, N. Y., a corporation of New York Application December 14, 1929, Serial No. 414,104
Renewed July 22, 1936

12 Claims. (Cl. 177—380)

This invention relates to an electric signaling system and more particularly to a signaling apparatus for transmitting distinctive current variations or signal impulses representative of certain information concerning a large number of definite items whereby such information may be visibly displayed or posted at a plurality of stations over a relatively small number of line wires, from a common transmitting station.

The invention is especially applicable to the transmission of varying quotations or prices of a multitude of different items such as stocks, bonds or commodities from some central point, such as a stock exchange, to numerous broker's offices, banks and similar places where it is desired to post the quotations automatically on indicator boards. The invention will be described with special reference to such a stock quotation system but it is to be understood that it is not limited to such a system.

In a copending application of R. Hoover, Serial No. 406,357 filed Nov. 11, 1929, entitled Electrical selecting and indicating system, Patent No. 1,976,398 granted Oct. 9, 1934, an electrical indicating system is described which is particularly adapted for the operation of a stock quotation or bulletin board, in response to transmitted signals, to automatically select a stock and a particular range thereof, such as the "yesterday's close", "open", "high", "low" or "last" quotation and to operate a series of indicators for posting a desired price or quotation of such selected stock. The numerical value of the quotation may involve four digits, namely the hundreds, tens, units, and fractional values thereof and in the system disclosed in said application provision is made at the quotation board for five sets of indicators for each stock, for posting the "yesterday's close", "open", "high", "low" and "last" quotations, each set including four indicator units for indicating the hundreds, tens, units, and fractional values of the stock.

The receiving apparatus, in response to the transmitted signals, selects the stock to be posted, selects the range thereof and operates the indicator units of the particular range and stock selected. In order to take care of the rate at which sales are made at the stock exchange and to control the receiving apparatus over a relatively small number of line wires it is necessary that the signals be transmitted very rapidly and accurately. For instance, taking into account the reasonable future requirements the signals must be transmitted at a rate of from 30 to 60 quotations per minute and the signals transmitted must be of such complex nature as to select one or more of at least five sets of indicators for any one of a thousand or more different stocks and to operate at least four indicator units for each set selected.

The type of signals employed for operating the receiving apparatus of the aforesaid application comprises three main groups of interspaced positive and negative impulses, the first group controlling the selection of the range and stock and being termed the "selecting" group, the second group serving to restore the selected indicators to normal or blank position and being termed the "restoration" group and the third group controlling the answer or quotation and being termed the "answer" group. Four transmitting channels are employed for the transmission of the signals of each group, such channels comprising either four separate line wires or two line wires having battery of positive and negative polarity applied to each line, in conjunction with polarized relays at the receiving station for responding to the direction of current transmitted over each of the lines.

During the selecting operation, four control channels are employed for choosing concurrently the range and stock. For this purpose, each group of indicators comprising the range, i. e., "yesterday's close", "open", "high", "low", and "last" and combinations thereof are designated by single digit numbers, the "last" quotations for instance, being designated (1) "low" and "last" (2) "high" and "last" (3) "low" (4) "high" (5) "open" (6) "high" and "open" (7) and "yesterday's close" (8). Similarly each stock is arbitrarily designated by a three digit number, the stocks having the greatest volume of sales and hence those most often quoted being designated by digits of low order, as 111, 121, etc.

The range is selected by transmitting over channel one, a number of marking impulses corresponding to the digit number of the range to be posted and the stock is selected by sending over channels two, three and four, marking impulses corresponding in number to the hundreds, tens and units digits respectively of the arbitrary stock designating number. The receiving apparatus in response to such impulses selects the stock and range and subsequently operates to transfer the four control channels from the selecting mechanism to the four indicator units of the range and stock selected. Each indicator unit may then be operated by transmitting the required number of marking impulses over the channel connected thereto.

In order to eliminate accumulative errors, each indicator selected is restored to its normal or blank position by transmitting ten restoration impulses over each of the four transmitting channels, channel one serving to restore the hundreds indicators and channels two, three and four, restoring the tens, units and fractions indicators, respectively, of the set or sets of indicators previously selected.

At the conclusion of the transmission of the restoration signals, the answer signals are transmitted over each of the four channels, in the form of positive and negative impulses corresponding in number to the hundreds, tens, units and fractions digits of the quotation.

In the receiving system described in the aforesaid Hoover application, equal intervals of time are allotted for the transmission of each group of stock selecting, restoring and answer signals. Thus, provision is made for a maximum of ten marking impulses for each group of signals transmitted over each channel and the signals of a succeeding group cannot be transmitted until the total time required for transmitting the ten preceding impulses has elapsed, regardless of whether the entire ten marking impulses are employed or not. This receiving system depending upon uniform signal periods has certain advantages, particularly in the simplification of the selecting apparatus and the present application relates particularly to a system for transmitting such signals of uniform periods, for the operation of a system of the type described in the said Hoover application.

One of the objects of the present invention therefore, is to provide apparatus for transmitting signals suitable for the operation of an automatic stock quotation board in which the signals of the selecting and answer groups will each have uniform transmitting periods in each instance.

Another object is to provide a signal transmitting device which is simple, dependable and capable of rapid operation.

A further object is to produce a signal transmitting system embodying a rotary transmitter in which a plurality of groups of signals of varying numbers of marking impulses may be transmitted over each of a number of channels, certain said groups being transmitted at a faster rate than others thereof.

Another object is to provide in a signal transmitting apparatus means for transmitting signals indicative of whether or not further signals are to be transmitted over a particular channel.

Other objects and advantages will clearly appear from the following description taken in connection with the accompanying drawings and appended claims.

In order that the invention may be more fully understood reference will be had to the accompanying drawings in which;

Figure 1 is a schematic diagram of the rotary transmitter and associated circuit arrangement of one embodiment of my invention;

Figure 2 illustrates a keyboard arrangement for controlling the signal transmission;

Figure 3 illustrates a locking arrangement for the keys of the transmitter;

Figure 4 is a current-time diagram showing the nature of the groups of current variations transmitted over the four control channels by the apparatus of Figure 1, and;

Figure 5 is a schematic diagram of a modified arrangement in which means is provided for transmitting signals indicative of whether or not answer signals are to be subsequently trnsmitted over a particular channel.

Figure 6A:
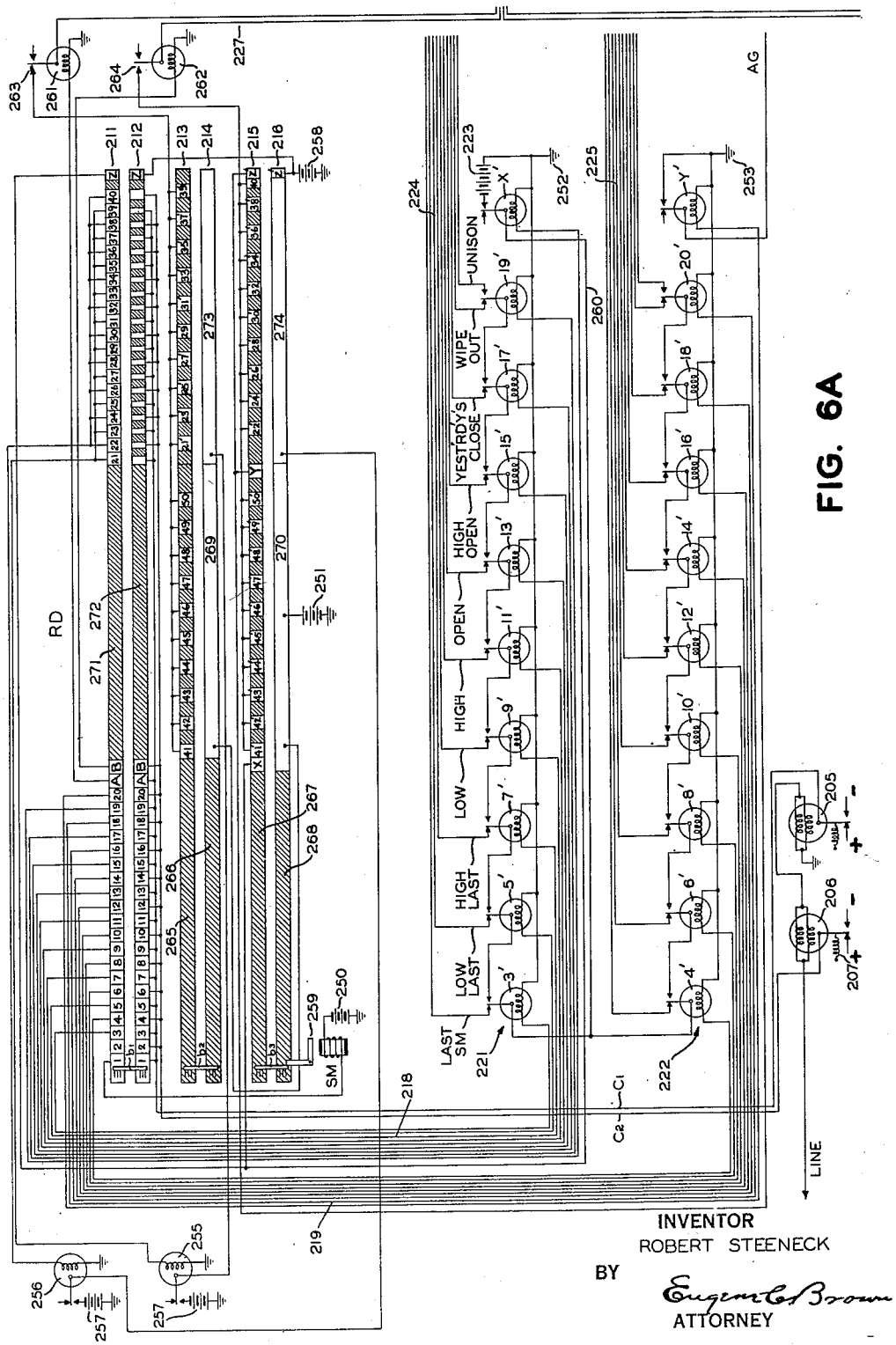
Figs. 6A and 6B illustrate diagrammatically the circuit arrangement of a receiver responsive to the signals transmitted by the modification shown in Fig. 5.

Referring first to Figure 4 in which I have shown the arrangement of the impulses transmitted by the apparatus of Figure 1, it will be noted that the signals are composed of three main groups namely, the range and stock selecting group, the restoration group and the answer group. Each group is followed by a rest period to permit certain transfer operations to take place at the receiving apparatus following the receipt of each group of signals.

These signal groups may be transmitted over two lines L1 and L2, each line constituting two control channels of communication. The positive marking impulses and no current or spacing signals over each line form one channel of communication and the negative marking impulses and no current or spacing signals form the other communicating channel. The signals transmitted over any one channel comprise marking impulses of a definite period and polarity separated by no impulse periods or spacing signals of equal or greater length. The negative impulses forming one channel are interspaced as far as possible with the positive impulses forming the other channel and both sets of signals are transmitted over the same line.

Provision is made for transmitting in different combinations of marking and spacing signals a total of ten impulses over each channel for each of the signal groups. However, the number of marking impulses actually transmitted in a particular instance, for each selecting and answer group depends upon the particular range and stock selected and upon the numerical value of the quotation. In the case of the stock and range selections, these marking signals will ordinarily be considerably less than ten impulses since, as before stated, the stocks having the greatest numer of sales are designated by numbers having digits of a low order. The remainder of the group of ten is filled in with spacing or no current periods. In the example illustrated in Figure 4 a group of signals is represented for transmitting the "last" quotation of a stock arbitrarily designated by the No. 353. While only five marking impulses (corresponding to digit 5) are transmitted over the channel having the maximum number of impulses it is to be understood that the signals of the restoration group are not transmitted until after a sufficient time has elapsed for the transmission of the full ten selecting impulses, followed by the first rest period. The restoration group always comprises ten marking impulses for each channel. In the same manner as in the selecting group, the answer group, representing a quotation of 254⅛ consumes only one half of the total period allotted to the answer group. The lines are idle during the remainder of the answer period.

In Figure 1, I have shown a system for transmitting the type of signals illustrated in Figure 4. The apparatus shown in Figure 1 comprises one half of the complete transmitting system, for controlling two of the channels over line L1. The opposite half of the system is identical and serves to transmit signals over the remaining two channels through a second line L2.

The system comprises a rotary distributor D (shown developed) having two sets of contact rings 101, 102 and 103, 104. Rings 101 and 102 are bridged by a brush b1 and rings 103 and 104 are bridged by a brush b2. The brushes b1 and b2 move in unison across the surface of the rings as is well understood in rotary distributor operation. The brushes b1 and b2 are normally held on their first segment by a stop latch 105, pivoted at 106.

Ring 101 is provided with three groups of twenty segments each numbered 1 to 20, 21 to 40 and 41 to 60 respectively and separated by insulating segments 61 and 62. The last segment 63 of ring 101 is grounded at 107. Ring 102 has a solid segment 64 coextensive with segments 1 to 60 of ring 101 and connected to the line L1. Ring 102 is provided with a final segment 65 and an initial segment 66. Ring 101 also has an initial segment 67.

Rings 103 and 104 each have two series of eighteen segments each numbered 1' to 18' and 41' to 58' disposed opposite to each other and opposite segments 2 to 19 and 42 to 59 respectively, of ring 101.

Odd numbered segments 1 to 19 are strapped together and connected to the back contact of a relay 108 and through relay tongue 109 to the odd numbered segments 21 to 39 which in turn are connected to the back contact of a relay 110 and through the relay tongue 111 to the odd numbered segments 41 to 59.

Likewise the even numbered segments 2 to 20 are connected together and to the back contact of relay 112 and through contact tongue 113 to the even segments 22 to 40, which in turn are connected to the back contact of relay 114 and through contact tongue 115 to the even numbered segments 42 to 60. Battery A of positive polarity is applied to the odd numbered segments 21 to 39 and battery B of negative polarity is connected to the even numbered segments 22 to 40.

Odd numbered segments 1' to 17' of ring 103 are also strapped together and connected to the contact tongue 116 of relay 108 and the even numbered segments 2' to 18' of ring 103 are strapped together and connected to the tongue 117, of relay 112. Similarly odd numbered segments 41' to 57' of ring 103 are connected together and to the tongue 118 of relay 110 and the even numbered segments 42' to 58' of ring 103 are connected to the tongue 119 of relay 114.

The front contacts of relays 108, 112, 110 and 114 are connected to a common conductor 120 and through the front contact and tongue 121 of relay 143 to the ground at 122. This ground connection is termed the "starting ground" and is ordinarily open at the contact tongue 121. One end of the windings of each of the relays 108, 112, 110 and 114 is connected to its adjacent contact tongue, the opposite ends of the windings being connected to a battery 123.

Each of the contacts of ring 104 are connected to a selecting grounding device which enables a ground to be placed upon any of said contacts. This grounding device is shown diagrammatically as comprising four rows G1, G2, G3 and G4 of ten keys each. Row G1 controls the setting up of the hundreds digits of the stock designating number and G4, controls the setting up of the range number of the stock. The tens and units digits of the stock selection are set up by corresponding keys associated with the second rotary distributor. Rows G2 and G3 control the setting up of the hundreds and tens digits of the answer or quotation and similar keys associated with the second distributor control the setting up of the units and fractions digits of the answer.

The odd numbered contacts 1' to 17' of ring 104 are connected in succession to the keys of row G4 and the even numbered segments 2' to 18' are similarly connected to the keys of row G1. A common ground contact 123 is provided for each row of keys. Similarly odd contacts 41' to 57' are connected to the keys of row G2 and even numbered contacts 42' to 58' are connected to the keys of row G3.

A release key R is also provided for releasing the brushes b1 and b2 after the selecting and answer signals have been set up.

The complete arrangement of the key-board may be as shown in Figure 2. Rows 131, 132 and 133 of keys control the transmission of the stock selecting signals for the hundreds, tens and units digits of the arbitrary stock designation number. Rows 134, 135, 136 and 137 control the transmission of the answer signals representing the hundred, tens, unit and fractional values of the stock and row 138 controls the transmission of the range selecting signals.

If it is desired to transmit signals for posting the "last" quotation of stock Number 353, quoted at a price of 254⅛ the shaded keys shown in Figure 2 would be depressed, thus grounding the segments of ring 104 connected to the depressed keys. Each key is retained in its depressed position during the movement of the brushes across the segments of the distributor by a latch 140 (see Figure 3) against the action of a spring 141 and the keys are released after the completion of the transmission of the selecting and answer signals by release relays 142. The construction of the grounding device forms no part of the present invention and therefore is not shown in greater detail.

In the example illustrated in Figure 4, the segments 1', 6', 43' and 50' of ring 104 would be grounded through the keys of rows 131, 134, 135 and 138 respectively. These rows are indicated in Figure 1 at G1, G2, G3 and G4.

After the stock selection and answer have been set up at the key-board, the release key R is depressed thus completing the circuit for the relay 143 from the battery 144, release key R and ground at 145. Relay 143 picks up and completes its locking circuit through its front contact and switch tongue 146, switch tongue 147 and back contact of relay 148, to the ground at 149. It also prepares the circuit from the ground 122, through contact 121, to the conductor 120 and thence to the front contacts of each of the relays 108, 112, 110 and 114.

A circuit is also completed from the ground 122 through segments 67 and 66 and brush b1 of the distributor to the windings of starting magnet SM. It will be noted therefore, that upon depression of release key R the latch 105 is disengaged from the brushes b1 and b2 and they are permitted to move across the segments of the distributor. It will be understood that the brushes b1 and b2 are operated by a continuously operating motor through a slip clutch in the usual manner in rotary distributor operation.

Brush b1 upon contacting with segments 1 completes a circuit from the positive battery connection A, through switch tongue 109 of relay 108 and segment 1 to the solid segment 64 of ring 102 and thence to the line L1 thus transmitting a positive impulse to the line. At the time brush b1 passes off of segment 1, brush b2 passes on to segment I' which at this time is grounded at 123 through the first key of row G4. This ground is continued through the brush b2 to the winding of relay 108 to the battery 123 causing the relay to pick up and complete a locking circuit to the ground 122 through contact tongue 116. The operation of relay 108 opens the circuit from the positive battery A through contact tongue 109 so that as the brush b1 continues to pass over the odd numbered segments 3 to 19 no signal impulses are sent out over the line L1.

As brush b1 passes on to segment 2, negative battery is supplied to the line through tongue 113 of relay 112, segment 2 and solid ring 64. Successive negative impulses are transmitted in this manner to the line as the brush b1 continues to pass over the even numbered segments until the brush b1 passes off of segments 6, at which time the brush b2 passes on to the grounded segments 6' of ring 104 and completes a circuit to the relay 112. Relay 112 upon picking up, completes its locking circuit to the ground 122 and opens the negative battery connection at contact tongue 113. Hence no further negative impulses are transmitted over line L1 until the brush b1 passes on to the segments 21 to 40 of the restoration group.

As the brush b1 passes across segments 21 to 40 of the restoration group, ten positive and ten negative interspaced impulses are transmitted to the line L1.

The movement of brush b1 across the segments of the answer group sends out alternate positive and negative impulses to the line until such time as the brush b2 passes on to a grounded segment of ring 104, as for instance segment 43', at which time relay 110 is operated to disconnect the positive battery from the odd numbered segments. Spaced negative impulses alone are then transmitted to the line until brush b2 passes on to grounded segment 50', which causes the operation of relay 114 to disconnect the negative battery from the even numbered segments. No further impulses are transmitted as the brushes b1 and b2 continue their cycle. As brush b1 moves on to the final contacts 63 and 65, the ground 107 is applied through a conductor 150 to the winding of relay 148 and to the key unlatching relays 142 of each of the depressed key levers. The depressed keys are thus returned to normal. The operation of relay 148 breaks the locking circuit for relay 143 at switch tongue 147 and thus causes relay 143 to release and break the starting ground connections 122 at the contact 121. This removes the ground connection from the starting magnet SM and from each of the relays 108, 112, 110 and 114 to return the same to normal position in readiness for the succeeding signal groups. Brushes b1 and b2 are brought to rest on their first contacts against the latch 105.

After the indicators representing the "high", "low" and "last" quotations have been once set up on the indicator board at a receiving station, the value of the quotation in most cases will vary only in the fractions and/or units value, as subsequent sales take place. It is not necessary therefore, in such cases to operate the hundred and tens indicator units and in some cases only the fractions indicators need to be reset. However, in the system described in the aforementioned Hoover application the ten restoration impulses for restoring each group of indicators to blank prior to setting up the new quotation are supplied by the receiving apparatus each time a new quotation is transmitted. This necessitates the retransmission of the full quotation to reset the indicators which were restored to blank position. In order to obviate the necessity of transmitting answer signals, except for such digits of the quotation as differ from the preceding quotation, I provide an arrangement, shown in Figure 5, in which signals may be transmitted to the receiving station for controlling the receiving apparatus and thereby to effect the omission of the local restoration signals for such indicators of the range selected as do not require resetting.

The arrangement of the contact segments of the distributor is the same as shown in Figure 1, except that two extra control segments 151 and 152 are provided immediately preceding segments 41' of rings 103 and 104 for disconnecting the positive and negative batteries A and B from the segments of the answer group in case no answer signals are to be transmitted corresponding to the hundreds or tens digit of the quotation. Two extra contacts 153 and 154 are also provided for ring 101 immediately following the selecting group and in a portion of the space occupied by insulating segment 61, of Figure 1. Similarly segments 153' and 154' are provided for each of the rings 103 and 104, arranged slightly in advance of contacts 153 and 154. Contacts 153' and 154' of ring 104 are connected to two keys 155 and 156 so that these contacts may be grounded througn the grounded contact 157. Contact 153' of ring 103 is connected to one end of the winding of relay 110, the opposite end of which is connected to a source of potential 158. Similarly contact 154' of ring 103 is connected to the winding of a relay 114 and thence to the battery 158.

Contact segment 153 controls the restoration segments for the hundred indicators at the receiving station and segment 154 controls the restoration signals for the tens indicators.

If it is desired to restore the indicators to blank positon, keys 155 and 156 are not depressed, consequently, a positive impulse will be transmitted as the brush b1 passes onto segment 153 and a negative impulse will be transmitted as the brush passes onto segment 154. These impulses operate mechanism at the receiving station for operating a relay to supply a group of restoration impulses to the hundreds and tens indicator units of the stock selected.

If it is desired not to transmit an answer for the hundreds value of the quotation, following the restoration, i. e., to leave the hundreds indicator dials in their blank position, key 159 is depressed grounding segment 151 of ring 104. As a result of this, relay 110 is operated as the brush b2 passes onto contact 151, thus removing the positive battery A from the odd numbered contacts (which control the hundreds indicators) and thereby rendering the transmitter ineffective to transmit marking signals over this channel. Likewise, if no answer is to be sent for the tens value of the stock, key 160 is depressed and through segment 152 the negative battery B is removed from the even numbered contacts whereby no marking signals will be transmitted over this latter channel.

If neither answer nor restoration impulses are to be supplied to the hundreds indicators, key 155 is depressed grounding the segment 153' of ring 104, thus causing the operation of relay 110 as the brush b2 passes onto segment 153' and disconnecting the positive battery from segment 153 and the odd numbered segments of ring 101, so that no impulse is sent over the line as brush b1 traverses segment 153. The receiving apparatus may be designed so that it responds to this no impulse period to disconnect the hundreds indicators from the restoration and answer impulse supplying mechanism, thus causing the hundreds indicators to remain in their previous setting. Similarly key 156 controls the omission of restoration and answer impulses from the tens indicators.

The units and fractions indicators are controlled through a rotary distributor associated with line L2.

Since the restoration impulses are provided locally at the receiving station, the restoration segments of ring 101 may be omitted.

In Figure 5 I have also shown a modified arrangement of the rotary distributor contacts in which the first group of segments 1 to 20 and 1' to 18' are made short relatively to the remaining segments 41 to 60, whereby the signals of the selecting group will be transmitted at a faster rate than those of the answer group. One of the purposes of this construction is to reduce the total time required for posting each stock. The time of transmission of the answer group is limited to the maximum speed of operation of the indicators units at the quotation board and with the present type of indicators should not exceed about twenty impulses per second. However, with the receiving system described in the aforesaid Hoover application the selecting operation involves only the setting of the contacts of a plurality of polarized relays, which may be operated at a rate of up to one hundred impulses per second. Consequently by transmitting the selecting signals at say twice the speed of the remaining signals, the transmission of a complete stock selecting and posting group of impulses is reduced from twelve to fifteen percent, depending upon the length of the rest period intermediate each signal group.

Another reason for making the segments at the forward end of the distributor rings of less width than at the opposite end, is to eliminate or reduce improper reception due to an unsynchronized condition of the transmitting and receiving distributors. In ordinary distributor construction, the segments of the transmitting apparatus are made of a width greater than that required of the receiving apparatus and the segments of the receiving distributor are made smaller than those of the transmitting distributor and are separated by insulating sections so that if the receiving and transmitting distributors are rotating in exact synchronism only the mid portion of the transmitted impulse is received on the segments of the receiving distributor.

In start-stop systems, such as shown in Figure 5, the receiving and transmitting distributors start out at the beginning of each revolution in unison, but the receiving distributor may either gain on or lag behind the transmitting distributor at the end of the revolution and if this out-of-phase condition is too great, the transmitted impulses may be received upon the wrong segment of the receiving distributor. By reducing the width of the transmitting segments at the forward end of the distributor, over which part, the receiving and transmitting distributors are in substantial synchronism and widening the transmitting segments at the end of the transmitting distributor a corresponding amount, greater leeway may be allowed in the relative speeds of the receiving and transmitting distributors without causing improper reception of the signals and without increasing the signal period.

It will be recalled in connection with the description of Fig. 5 that the signals transmitted over line L1 comprise three groups of impulses, the first group consisting of a number of interspaced positive and negative impulses corresponding respectively to the range and hundreds stock designation; the second group consisting of a single positive impulse if the hundreds indicators are to be restored to blank and a single negative impulse if the tens indicators are to be restored to blank; and, the third group consisting of a number of interspaced positive and negative impulses corresponding respectively to the hundreds and tens digits of the price.

Figure 6B:
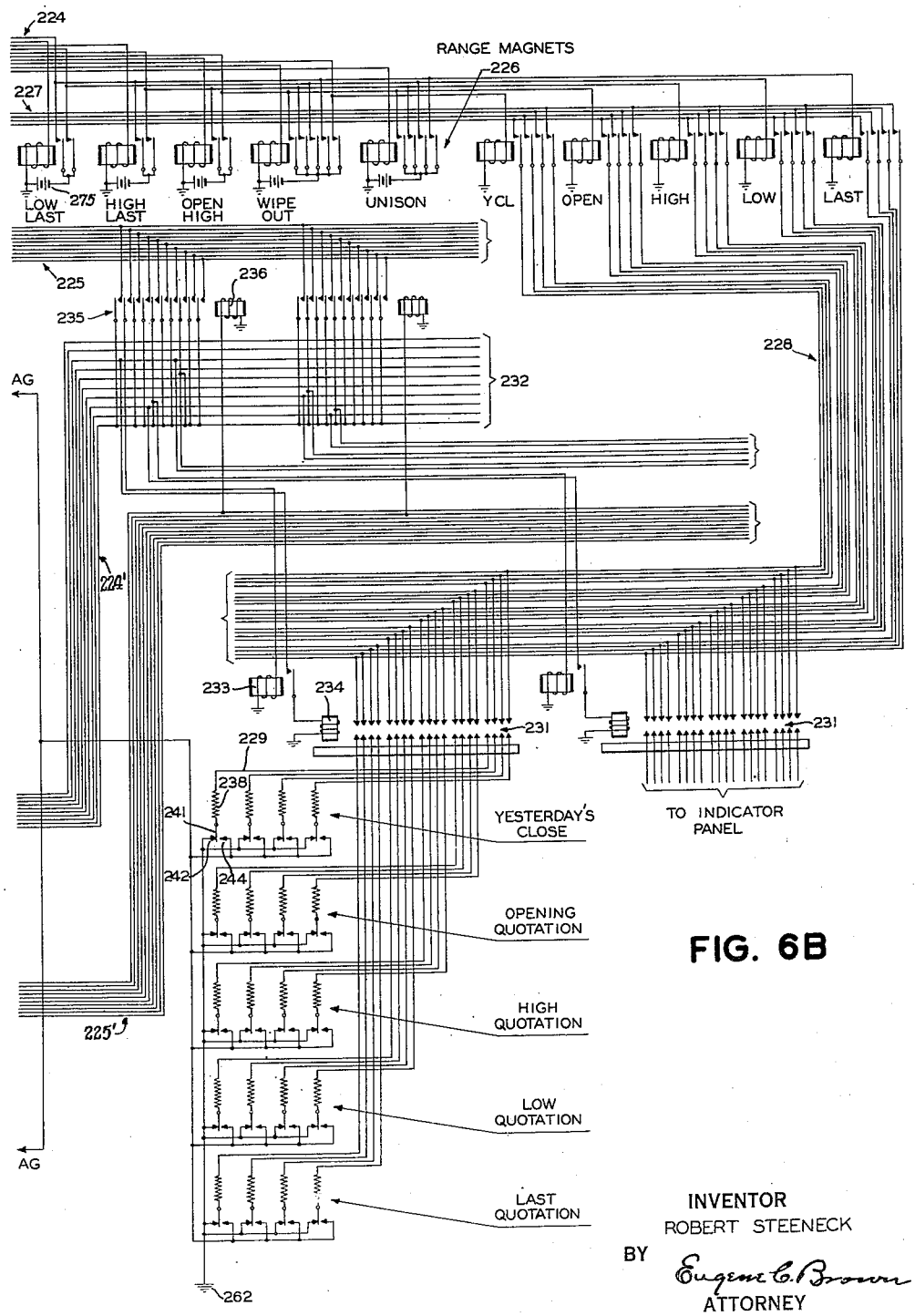

The receiver for responding to these signals may be of the type disclosed in the aforesaid application of R. Hoover. As shown in Figs. 6A and 6B, the line L1 extending from solid ring 102 of the distributor 105 terminates in the windings of two polar relays 205 and 206, the windings of which are reversed relative to each other.

The stationary contacts of relays 205 and 206 are connected to battery of opposite polarity and the tongues are biased, as by a spring 207, towards the positive contact. The windings of relays 205 and 206 are arranged so that relay 205 operates in response to a positive impulse received over line L1 to connect the conductor C1 to negative battery and relay 206 operates in response to negative impulses received over line L1 to connect the line C2 to negative battery.

Rings 211 and 212 are provided at one end with a series of segments numbered one to twenty. The alternate or odd numbered segments of ring 212 are strapped together and connected to transmitting channel C1 and the even numbered segments are also strapped together and connected to transmitting channel C2. On ring 211, segment 1 is joined by a conductor with one end of the winding of a starting magnet SM having its opposite end connected to a battery 250 of positive polarity. Contact 2 is dead or unconnected and contacts 3 to 20 are each connected to one end of the windings of the polarized relays of groups 221 and 222, indicated by the corresponding reference characters, primed, that is the odd contacts are connected in succession to the windings of the relays of bank 221 and the even contacts are connected in succession to the windings of the relays of bank 222. The opposite ends of the windings of each of the polarized relays 3' to 20' are grounded at 252 or 253.

The segments 1 to 20 comprise the selecting group for the range and hundreds stock number. Following, the selecting group, rings 211 and 212 are provided with two segments A and B.

Segments A and B of ring 212 are connected to channels C1 and C2 respectively and segments A and B of ring 211 are connected to the windings of two polarized relays 261 and 262, respectively.

Rings 213, 214, 215 and 216 are provided with insulating segments 265 to 268 over which their brushes b2 and b3 pass during the passage of brush b1 over the selecting group of segments 1 to 20. Following segment 265, ring 215 has a single segment X connected to one end of the winding of relay X' of group 221. Immediately following insulating segments 265 to 268 and segment X, rings 213 and 215 are provided with a series of ten live segments 41 to 50 and 41' to 50' respectively, separated by insulating segments. The live segments 41 to 50 and 41' to 50' of each ring are strapped together and connected to two of the four wires comprising group 227, which are connected through the "range" magnets 226 (Fig. 6B) to the windings of the magnets of the indicating units of the particular range and stock selected.

The remaining two wires of group 227 extend from a similar set of segments on a duplicate rotary distributor (not shown). The group of segments 41 to 50 and 41' to 50' comprise the "restoration" group for restoring the hundreds and units indicator to blank position at the indicator panel, by supplying a series of ten impulses thereto.

Ring 215 is provided with an extra contact Y following segment 50' which is connected to the winding of relay Y' to energize the same from negative battery 251, and thereby to connect ground 253 to the actuating ground line AG, through the tongue of relay Y'.

Rings 214 and 216 are provided with solid segments 269 and 270, respectively, arranged opposite the segments of the "restoration" group and opposite segment Y. These segments, 269 and 270, are connected to negative battery 251.

The rings 211 to 212 are each provided with insulating segments 271 and 272 respectively, opposite the segments of the restoration group. Following the segments 271 and 272 the rings 211 and 212 are provided with a second series of twenty segments numbered 21 to 40. The odd numbered segments of ring 212 are strapped together and connected to channel C1 and the even numbered segments are likewise strapped together and connected to channel C2. The segments 21 to 40 of ring 212 are separated by insulating segments so that when the transmitted impulses constituting the "answer" are supplied thereto, over channels C1 and C2 only the peak or central portion of the signal will be effective. This prevents any danger of signals of one polarity applied to one contact from lapping over on to the succeeding contact.

The odd numbered segments 21 to 39 of ring 211 are also strapped together as are the even numbered segments, the former being connected to one end of the winding of a polarized relay 255 and the latter to one end of the winding of a polarized relay 256. The opposite ends of the windings of relays 255 and 256 are grounded.

Segments 21 to 40 are termed the "answer" group and control the transmission of the signals for the hundreds and tens digits of the quotation.

Opposite the "answer" group, rings 213 and 215 are provided with a series of ten live segments separated by insulating segments, the live segments of ring 213 being designated by the odd numbers 21' to 39' and those of ring 215 by the even numbers 22' to 40'. The segments 21' to 39' of ring 213 are strapped together and connected to the hundreds wire of the four wire group 227 and segments 22' to 40' of ring 215 are likewise strapped together and connected to the tens wire of group 227. The odd numbered segments 21' to 39' and the even numbered segments 22' to 40' are termed the "regenerating" group of the hundreds and tens indicators respectively.

It should be noted that the segments 21' to 40' have their front edges substantially in line with the rear edges of the correspondingly numbered segments 21 to 40 of ring 211. This insures that the polarized relays 255 and 256 will have operated prior to the engagement of the brushes b2 and b3 with the regenerating segments, thus causing impulses corresponding to the full length of the regenerating segments to be supplied to the indicator magnets.

Opposite the regenerating segments, rings 214 and 216 are provided with solid segments 273 and 274, respectively, which are connected to the tongues of the polarized relays 255 and 256. The marking contacts of relays 255 and 256 are connected to battery 257 of negative polarity.

Following the segment 40', rings 215 and 216 have final segments Z', Z' and rings 211 and 212 have corresponding segments Z, Z. These segments when bridged by brushes b3 and b1 respectively, connect positive battery 258 to the windings of relays X' and Y' for returning the tongues thereof to the left hand contact and thereby to disconnect the battery 223 from the lines 224 and 225 and also to disconnect the ground 253 from the actuating ground line AG. The restoration of these relays to their normal position places the circuit in condition for the transmission of the succeeding signal.

The operation of the distributor and its associated selecting mechanism will now be described:

Assuming, that the stock selection is the "last" quotation of stock numbered 236, and that the brushes b1, b2 and b3 are in their starting position, with brush b1 bridging segments 1 and brushes b2 and b3 bridging insulating segments 165, 166 and 167, 168, respectively. The single positive impulse corresponding to the "last" quotation is transmitted over channel C1 and energizes the starting magnet SM, thus releasing the latch 259.

The starting magnet SM is normally unenergized due to the positive battery 250 connected thereto which opposes the positive battery applied through the contacts of relay 205. It will be remembered, however, that when a positive signal is transmitted over the line L1 the relay 205 applies a negative battery to channel C1 which assists battery 250 to operate the starting magnet. Upon release of the latch 259 the brushes b1, b2 and b3 move in unison across the three sets of rings.

The brushes move in synchronism with the incoming signals so that as the first negative signal is transmitted over line L1 and repeated over channel C2 to segment 2, brush b1 passes on to segment 2. This segment being unconnected nothing occurs. When the brush b1 engages segment 3, if a positive signal is being transmitted over line L1, relay 205 will connect negative battery across segment 3 and through the conductor connected thereto, to the winding of polarized relay 3'. The armature of this relay will then be moved to its marking or right hand contact. The right hand contact of each of the relays 3' to 18' is connected to the tongue of the succeeding relay. The right hand contacts of relays 19' and 20' are connected directly to the last or tenth wire of the groups 224 and 225 and the left hand contacts of each of the relays 3' to 20' are connected directly to the remaining wires of the groups 224 and 225.

If no positive signal was being transmitted over the line L1 when the brush b1 passed over contact segment 3, as in the case of the "last" quotation, positive battery would be applied to the winding of relay 3' and its tongue would be moved against its spacing or left hand contact, thus connecting one of the wires of the group 224 through the tongue of relay 3' to a conductor 260 connected to the tongue of relay X'. This prepares a circuit from one of the range magnets of the group 226, to the battery 223, the circuit being held open however, at the contact of the relay X'. This relay it will be recalled, was moved to its left hand or spacing contact by the positive battery 258 supplied to contacts Z, Z as the brush b1 completed the preceding cycle operation.

As the brush b1 passes over the succeeding odd numbered contacts and assuming no further positive signals are transmitted over the line L1, the armatures of each of the odd numbered relays 5' to 19' move to their spacing or left hand contacts but since the tongue of relay 3' is also on its spacing contact no circuit is prepared for the remaining wires of group 224, to the battery 223.

Going back to the negative signals transmitted over line L1, the second negative signal over this line is received as the brush b1 reaches segment 4, thus causing negative battery to be supplied to the winding of relay 4', and thereby moving its tongue to marking or right hand contact. Since only two signal impulses are required to make up the hundreds digit of the stock designating number, no further negative signals are supplied to the remaining even numbered relays 6' to 20' and their contact tongues are moved to spacing or left hand position by the positive battery applied by the relay 206.

It will be noted that a circuit has thus been prepared from the tongue of relay X', conductor 260, right hand contact of relay 4' and left hand contact of relay 6' to the second conductor of the group 225.

Similarly the relay banks of the duplicate selecting unit controlled over a separate line, would simultaneously prepare circuits through the third and sixth wires of the groups 224' and 225' respectively (Fig. 6B).

As stated when no signals representing the hundreds digit of the quotation are to be transmitted, no impulse is sent over line L1 as segment 153 of Fig. 5 is crossed and consequently relay 205 of Fig. 6A remains on the positive contact to apply positive battery to the channel C1, as brush b1 passes on to segment A. This positive battery operates relay 261 to move the switch tongue thereof to its right hand or spacing contact and thereby disconnect the restoration segments 41 to 50 from the hundreds wire of group 227.

Likewise when no signals representing the tens digits of the quotation are to be sent no signal is transmitted over line L1 as segment 154 of Fig. 5 is crossed and hence relay 206 remains on its positive contact to apply positive battery to segment B, to operate relay 262 to its right hand side to disconnect the restoration segments 41' to 50' from the tens wire of group 227.

In case answer signals are to be transmitted representing the hundreds or tens digits of the quotation, the impulses over line L1 will be of such polarity as to apply negative battery to the relays 261 and 262, through control channels C1 and C2, respectively, whereby to connect the segments of the restoration groups through the tongues of relays 261 and 262, to the wires of group 227.

In this manner any indicator may be reset to blank or retained in its original position by means of signals transmitted over the control channels and received upon segments A and B.

As the brush b3 passes from the insulating segment 166 it engages contact X, thus applying negative battery to the relay X', whereby its contact tongue moves to the right and completes a circuit from the battery 223 to the selected wires of groups 224 and 225.

Referring to Fig. 6B, it will be noted that each conductor of the group 224 is connected to one end of the winding of one of the "range" magnets 226, the opposite ends of the windings being grounded. Thus, conductor one of group 224 (counting from the top) is connected to the winding of the "last" selecting magnet, wire two to the winding of the "low-last" selecting magnet, wire three to the "high-last" magnet, wire four to the "low" magnet, wire five to the "high" magnet, wire six to the "open" magnet, wire seven to the "high-open" magnet, wire eight to the "yesterday's close" magnet, wire nine to the "wipe out" magnet and wire ten to the "unison" magnet. The operation of the "yesterday's close", "open", "high", "low" and "last" selecting magnets connects the four wires of the group 227 to each of the five groups of wires indicated at 228 which latter wires are connected through the multi-contact switches 231 with the windings of the indicator magnets.

In the present example, the connection of battery 223 to wire one of group 224, through the relay 3' causes the "last" selecting relay to operate thus connecting the four wires 227 to the group of four wires terminating at the indicator magnets which operate the hundreds, tens, units and fraction indicators of the "last" quotation.

The operation of the selecting magnet marked "low-last", connects the battery 275 through the contacts of this magnet to the windings of the "low" selecting magnet and the "last" selecting magnet, thus permitting the windings of the indicators of both of these groups to be connected to the lines 227. The "high-last" selecting magnet functions similarly with respect to the "high" and "last" groups of indicators and the "open-high" selecting magnet likewise connects the lines 227 to the "open" and "high" groups of indicators. The selecting magnet marked "wipe out" has five contacts and serves to connect battery to the windings of each of the "yesterday's close", "open", "high", "low" and "last" selecting magnets so as to enable all of the indicators to be operated for the particular stock selected and the "unison" selecting magnet permits all except "yesterday's close" indicators to be operated simultaneously.

Each of the wires of group 227 are connected to one of the sets of restoration segments of the rotary distributors D, one of the wires being connected to the restoration and regenerative segments of ring 213 for controlling the hundreds indicators and another to the similar segments of ring 215 to control the tens indicators. The remaining two wires are connected to similar segments of the duplicate rotary distributor (not shown), to control the units and fractions indicators.

At the same time battery is applied to the selected wire of group 224 to operate one of the "range" magnets, the same battery is applied through relay 6', and the second conductor of group 225 to the second contact of each of the multi-contact switches 235. Simultaneously battery is applied through the duplicate relay banks to the third wire of group 124' connected to the third horizontal conductor of the grid 232 and to the sixth wire of the group 225' for operating the switch 236 of the sixth group of vertical conductors of the grid. Upon operation of the selecting magnet 236 and closing of the contacts 235 thereof, the selected vertical conductor of the grid is connected to the battery 223.

The application of battery to one of the vertical conductors and to one of the horizontal conductors of the grid effects the closing of one of the switches 231, thus completing the circuit from the wires 227 to the indicator magnets of the particular range selected.

The operation of the range magnets and the closing of switch 231 occurs as the brush b3 passes on to segment X. Immediately following this the brushes b2 and b3 pass on to the restoration group of contacts and thereby supply a series of ten negative impulses from the battery 251, solid segments 269 and 270, brushes b2 and b3 of each of the distributors D and the wires 227 to the indicator magnets thus stepping each indication drum around until its blank portion comes in front of the window of the indicator panel. Thereupon, the ground connection for the indicator magnet is broken through passage of the brush 241 off of the grounded contact 242 and on to the ungrounded contact 244. The contact 244 is connected by the actuating ground wire AG to the tongue of relay Y'.

When the brush b3 leaves the last segment 50' it moves on to contact segment Y, thus completing a circuit from the battery 251 to the winding of the relay Y' causing its contact tongue to be moved to the right and thereby completing the circuit to the actuating ground at 253. The indicator magnets are thus again grounded so as to respond to the succeeding "answer" signal train transmitted over the line for resetting the indicators to their new position.

The first "answer" signal over channel C1 is received as the brush b1 starts onto segment 21. This signal is regenerated through polarized relay 255 and segment 21' of ring 219 and the regenerated signal is conducted by one of the wires 227 to the hundreds indicator magnet of the chosen "range". The succeeding signal is transmitted over channel C2 as the brush b1 passes on to segment 22 and after being regenerated through polarized relay 256 and segment 22' of ring 215 is conducted to the magnet of the tens indicator.

At the conclusion of the transmission of the "answer" the brushes b1 and b3 engage contact segments Z and Z' and by applying positive battery to the windings of relays X' and Y' return their armatures to the normal or left hand position. This removes the battery 223 from the selecting magnets 226, grid control magnet 236 and stock magnets 233 and 234, thus restoring the contacts controlled by these magnets to their normal or open position.

The relays 3' to 20' need not be restored to any predetermined position since they are positively reset in the proper position during the transmission of the succeeding selecting impulses.

I am aware that the invention may be embodied in other specific forms without departing from the spirit or essential attributes thereof and therefore I desire the present embodiments to be considered in all respects as illustrative, rather than restrictive, reference being had to the appended claims, rather than to the foregoing description, to indicate the scope of the invention.

What is claimed is:

1. Apparatus for transmitting impulses to control the operation of quotation indicators or similar apparatus comprising a rotary distributor, a line associated therewith, a plurality of groups of transmitting segments on said distributor, each group comprising a plurality of segments, means for applying potential of opposite polarity to the adjacent segments of each group to transmit interspaced positive and negative impulses to the line to provide two control channels of communication, control segments on said distributor, means for applying a predetermined electrical condition selectively to said control segments and means including said control segments and last mentioned means for varying independently the number of positive and negative impulses transmitted over said line.

2. Apparatus for transmitting impulses to control the operation of quotation indicators or similar apparatus comprising a rotary distributor, a line associated therewith, a plurality of groups of transmitting segments, means for applying potential of opposite polarity to the adjacent segments of each group to transmit interspaced positive and negative impulses to the line to provide two control channels of communication and means for varying the number of positive and negative impulses transmitted over each channel, said last means comprising a relay for each group of each channel, contacts controlled by said relays for applying said source of potential to said segments and means for operating said relays after a predetermined number of impulses of each polarity have been transmitted to disconnect said source of potential from said segments.

3. Apparatus for transmitting impulses to control the operation of quotation indicators or similar apparatus comprising a rotary distributor having a plurality of groups of transmitting segments, a line associated therewith, means for applying potential of opposite polarity to the adjacent segments of each group to transmit interspaced positive and negative impulses to the line to provide two control channels of communication and means for varying the number of positive and negative impulses transmitted over each channel, said last means comprising a group of control segments on said distributor for each of said groups of transmitting segments, means for preparing circuits through certain of said control segments of each group for subsequent completion during the operation of said distributor, a relay in each of said circuits, said relays, upon completion of said circuits, operating to remove said potentials from predetermined contacts of said distributor.

4. Apparatus for transmitting impulses to control the operation of quotation indicators or similar apparatus comprising a rotary distributor having a plurality of groups of transmitting segments, a line associated therewith, means for applying potential of opposite polarity to the adjacent segments of each group to transmit interspaced positive and negative impulses to the line to provide two control channels of communication and means for varying the number of positive and negative impulses transmitted over each channel, said last means comprising a group of control segments on said distributor for each of said groups of transmitting segments, means for preparing circuits through certain of said control segments of each group for subsequent completion during the operation of said distributor, a relay in each of said circuits, said relays, upon completion of said circuits, operating to remove said potential from predetermined contacts of said distributor, locking circuits for said relays and means operating after the completion of the transmission of said signals for interrupting said locking circuits to restore said relays to normal.

5. Apparatus for transmitting electrical impulses comprising a distributor, a line associated therewith, a plurality of transmitting contacts on said distributor, means for applying potential of opposite polarity to the adjacent contacts to transmit interspaced positive and negative impulses to the line, control segments on said distributor, means for applying a predetermined electrical condition selectively to said control segments and means including said control segments and last mentioned means for varying the number of impulses of each polarity transmitted over the line.

6. Apparatus for transmitting electrical impulses comprising two sets of contacts, the contacts of one set alternating with those of the other, means for applying potential of opposite polarity to each set, means cooperating with the contacts in succession to transmit interspaced positive and negative signals, means for rendering at least one of said sets of contacts ineffective to transmit signals and means acting prior to the operation of said latter set of contacts, to transmit a signal of a nature depending upon whether said latter set of contacts has been rendered ineffective to transmit signals.

7. Apparatus for transmitting electrical impulses comprising two sets of contacts, the contacts of one set alternating with those of the other, means for applying potential of opposite polarity to each set, means cooperating with the contacts in succession to transmit interspaced positive and negative signals, means for rendering either or both of said sets of contacts ineffective to transmit signals, and means acting prior to the time of operation of each set of contacts for transmitting signals representative of the condition of each set of contacts.

8. Apparatus for transmitting electrical impulses comprising a distributor, at least two groups of contacts thereon, means cooperating with the contacts of each group in succession to transmit independent groups of signals, means for varying the number of impulses transmitted by the first of said groups of contacts, means for rendering the latter group of contacts ineffective to transmit signals, and means acting subsequent to the operation of said first group of contacts and prior to the operation of said latter group of contacts to transmit a signal of a nature depending upon whether or not said latter group of contacts has been rendered ineffective to transmit signals.

9. Apparatus for transmitting electrical impulses comprising a line, a rotary transmitter, a plurality of groups of main transmitting segments thereon, means for applying potential conditions to said segments to transmit a plurality of groups of main signal impulses, an auxiliary transmitting segment, means for applying a potential condition to said auxiliary segment to transmit a signal representative of the potential condition of one of said main groups of segments, a control segment, a selective circuit including said control segment, means controlled by said circuit for varying the potential condition of said one of said groups of main segments and said auxiliary segment to render them ineffective to transmit signals to said line.

10. Apparatus for transmitting electrical impulses comprising a line, a rotary transmitter, a plurality of groups of main transmitting segments thereon, means for applying potential conditions to said segments to transmit a plurality of groups of main signal impulses, an auxiliary transmitting segment, means for applying a potential condition to said auxiliary segment to transmit a signal representative of the potential condition of one of said main groups of segments, a group of control segments, selective circuits including said control segments for varying the number of impulses transmitted by each of said groups of main transmitting segments, an auxiliary control segment, a circuit including said auxiliary control segment, means controlled by said latter circuit for varying the potential condition of said one of said groups of main segments and said auxiliary segment to render them ineffective to transmit signals to said line.

11. In an apparatus of the character described, the combination of a selective switching means, a plurality of arcuately disposed contacts electrically connected with said switching means, and a single circuit making and breaking revolving switch arm adapted to successively engage said contacts, said contacts being circumferentially spaced in groups, the individual spacing of the contacts of one group varying from that of another group.

12. In an apparatus of the character described, the combination of a signal transmitting circuit, a plurality of series of contacts, a signal selecting means to form predetermined circuit connections with one of said series of contacts individually spaced at given intervals, additional signal selecting means to form predetermined circuit connections with another of said series of contacts individually spaced at different intervals from those of said first named series, means for applying an electric current to said predetermined circuit connections, and unitary circuit making and breaking means for successively connecting both of said series of contacts with said signal transmitting circuit.

ROBERT STEENECK.